Patented May 15, 1951

2,553,475

UNITED STATES PATENT OFFICE 2,553,475

MANUFACTURE OF DYESTUFFS

Alan Charlton Robson and Frank Hayhurst Slinger, Blackley, Manchester, England, assignors to Imperial Chemical Industries Limited, a corporation of Great Britain No Drawing. Application March 16, 1948, Serial No. 15,266. In Great Britain March 28, 1947

6 Claims. (Cl. 260—299)

This invention relates to the manufacture of dyestuffs and more particularly it relates to an improved process for the manufacture of the leuco-sulphuric esters of vat dyestuffs and anthraquinone intermediates.

In British specification No. 272,156 it was proposed to make sulphuric esters of leuco derivatives of vat dyestuffs by reacting a quaternary ammonium halide which may be obtained by the reaction between a tertiary organic base and an alkyl halide, in tertiary organic base suspension, with a metal, reacting the product with a vat dyestuff, and then reacting the resulting mixture with a product obtained by the interaction of a tertiary base with a reagent adapted to yield the sulphuric anhydride compound of the tertiary base for example an alkyl chlorsulphonate, chlorsulphonic acid, oleum or sulphur trioxide. Pyridine and dimethylaniline were mentioned as examples of tertiary bases which could be used in the process.

We have now found that in the above process improved results are obtained in the manufacture of the metal derivatives of leuco compounds when the reduction of the vat dyestuff or of an anthraquinone intermediate with metal is carried out in the presence of ammonia or a primary or secondary amine as hereinafter defined and we have also found that in place of the quaternary ammonium halide, other catalysts for the reduction may be employed.

The primary and secondary amines used in the process of this invention are those primary and secondary amines which have the property of forming coordination compounds with copper hydroxide in aqueous medium, that is to say those primary and secondary amines which give a blue coloured solution when added to an aqueous suspension of copper hydroxide. It is well known that ammonia gives a blue coloured solution with copper hydroxide.

According to our invention therefore we provide a process for the manufacture of a metal derivative of the leuco derivative of a vat dyestuff or anthraquinone intermediate characterised in that the vat dyestuff or anthraquinone intermediate is reduced with a metal in the presence of ammonia or a primary or secondary amine as hereinbefore defined.

According to a further feature of our invention we provide a process for the manufacture of leuco-sulphuric esters of vat dyestuffs and anthraquinone intermediates characterised in that the vat dyestuff or anthraquinone intermediate is reduced with a metal in the presence of ammonia or a primary or secondary amine as hereinbefore defined and the resulting metal salt of the corresponding leuco-compound or complex compound comprising the metal salt of the corresponding leuco-compound is reacted with sulphur trioxide or with a substance which can behave like or give rise to sulphur trioxide in the reaction mixture.

The reaction can be applied to vat dyestuffs of the anthraquinone, indigoid or thioindigoid series.

As a suitable metal for use in the reaction there may be mentioned zinc and as examples of the primary and secondary bases as hereinbefore defined there may be mentioned methylamine, ethanolamine, ethylene diamine and diethanolamine.

The reduction of the vat dyestuff may sometimes with advantage be carried out in the presence of small quantities or inorganic or organic salts which behave as reduction catalysts. Suitable salts are for example sodium $\beta$-naphthalene sulphonate, potassium ethyl sulphate, ferric chloride and magnesium chloride.

In carrying out the process of the invention the vat dyestuff or intermediate, the base, the metal and if desired, the organic or inorganic salt may be stirred together in a suitable diluent at a suitable temperature until reduction of the dyestuff is complete and the resulting metal salt of the corresponding leuco-compound or the complex compound comprising the metal salt of the corresponding leuco-compound may then be converted to the corresponding leuco-sulphuric ester at the same temperature or at a different temperature.

Suitable diluents for use in the reduction are for example benzene, chlorobenzene, acetone, pyridine, acetonitrile, ethylene dichloride, dimethylformamide and diethylformamide.

The conversion of the metal salt of the leuco vat dyestuff or intermediate or the complex compound comprising the same into the corresponding sulphuric ester may be effected by treating it with sulphur trioxide or with a substance which behaves like or can give rise to sulphur trioxide, in the presence of a tertiary base, for example pyridine, but preferably in the presence of an organic amide in which the hydrogen atoms attached to the amide nitrogen atom have been replaced by hydrocarbon radicals or substituted hydrocarbon radicals. As suitable amides for use in the reaction there may be mentioned the amides of carboxylic acids for example dimethylformamide, diethylformamide, dimethylacetamide, formylpiperidide and tetramethylurea and the amides of sulphonic acids for example N:N-diethyl-p-toluenesulphonamide.

As examples of substances which can behave like or give rise to sulphur trioxide in the reaction mixture there may be mentioned the addition compound of sulphur trioxide with an organic amide, for example dimethylformamide, or an ester of chlorosulphonic acid.

By the process of this invention it is possible to make in satisfactory yield and quality the leuco sulphuric ester derivatives of some vat dyestuffs which are difficult to reduce and which accordingly give unsatisfactory yields of leuco sulphuric esters by the processes hitherto available.

The sulphuric esters of leuco derivatives of vat dyestuffs made by the process of our invention are applied by the conventional methods in the printing and dyeing of textile materials.

The invention is illustrated but not limited by the following examples in which the parts are by weight.

Example 1

3.85 parts of 6:6'-diethoxythioindigo, 0.3 part of naphthalene β-sodium sulphonate and 3.0 parts of zinc powder are stirred in 20 parts of dimethylformamide containing 1.9 parts of methylamine. After stirring the mixture for 1 hour at 20° C. reduction of the vat dyestuff is complete. The mixture is cooled to 0° C., and 4.8 parts of sulphur trioxide in the form of its compound with dimethylformamide are added. The solution is stirred for ½ hour, and the reaction mixture is then poured into dilute sodium carbonate solution and the sodium salt of the leuco-sulphuric ester of 6:6'-diethoxythioindigo is isolated in almost quantitative yield of filtering off the zinc salts and salting out from the filtrates with sodium chloride.

If the methylamine is omitted the yield of leuco-sulphuric ester formed under the above conditions is only 16%.

In place of methylamine, there may be used ethylene diamine when the yield of leuco sulphuric ester is again almost quantitative. Methylamine and ethylene diamine both produce deep blue coloured solutions when added to an aqueous suspension of cupric hydroxide.

Example 2

3.85 parts of 6:6'-diethoxythioindigo, 3.0 parts of zinc powder, 20 parts of dimethylformamide and 1.20 parts of anhydrous ethylene diamine are stirred together at 20° C., for one hour. The pale greenish mixture is then cooled to 0° C., and 4.8 parts of sulphur trioxide in the form of its compound with dimethylformamide are added. The reaction mixture is stirred for ½ hour and then poured into dilute sodium carbonate solution. The leuco-sulphuric ester sodium salt is isolated in 75% yield by filtering off the zinc salts and salting out from the filtrates.

If the ethylene diamine be omitted no leuco sulphuric ester sodium salt is obtained under the above conditions.

Example 3

4.7 parts of 2(1-amino-2-anthraquinoyl)-5':6'-phthaloylbenzoxazole, 3.9 parts of zinc powder, 1.0 part of naphthalene β-sodium sulphonate, 10 parts of benzene, 15 parts of dimethylformamide and 0.5 part of methylamine are stirred together for 5 hours at a temperature of 80–85° C. The mixture is cooled to 0° C., and 6 parts of sulphur trioxide in the form of its compound with dimethylformamide are added. The reaction mixture is stirred for ½ hour and then poured into dilute sodium carbonate solution. The leuco-sulphuric ester sodium salt of the vat dyestuff is isolated in quantitative yield by filtering off the zinc salts and salting out from the filtrates.

In place of the methylamine in this example an equivalent quantity of ethanolamine can be used.

Example 4

To a suspension of 3.3 parts of 5:5'-dibenzoylamino-1:1'-dianthrimidecarbazole in 44 parts of ethylene dichloride containing 0.95 part of methylamine in solution, there are added 0.5 part of tetraethylammonium chloride and 3.9 parts of zinc dust. The reaction mixture is stirred under an atmosphere of nitrogen for 1½ hours at 20° C. and is then sulphated by adding 12.8 parts of dimethylformamide sulphur trioxide (equivalent to 5 parts of sulphur trioxide) at 0° C. and stirring the mixture for 20 minutes at 0° C. A solution of 8 parts of sodium carbonate in 180 parts of water is then added and the mixture is distilled in vacuo. The zinc residues are separated by filtration and the leuco sulphuric ester is salted out from the filtrate.

Example 5

3 parts of 2-chloro-3-acetylaminoanthraquinone, 0.3 part of sodium β-napthalenesulphonate, 2.4 parts of anhydrous ethylene diamine, 2.0 parts of zinc dust and 20 parts of acetonitrile are stirred together at room temperature in a nitrogen atmosphere for 1 hour. The red solution thus obtained is sulphated at 0° C. by adding 12 parts of dimethyl formamide sulphur trioxide and stirring for 30 minutes. A solution of 18 parts of sodium carbonate in water is added and the acetonitrile is then removed by distillation in vacuo. The zinc residues are separated by filtration and the potassium salt of 2-chloro-3-acetylamino - anthrahydroquinone - 9:10 - disulphuric ester is salted out from the filtrate by adding potassium chloride.

Example 6

4.7 parts of 2(1-amino-2-anthraquinonyl)-5':6'-phthaloylbenzoxazole, 0.2 part of potassium methyl sulphate, 10 parts of dimethyl formamide, 13 parts of benzene, 3.9 parts of zinc dust and 0.3 part of ammonia are stirred in an inert atmosphere for 5 hours at 80–85° C. The leuco salt so formed is sulphated with 14 parts of dimethyl formamide sulphur trioxide at 0° C. for 30 minutes. The product is poured into a solution of 22 parts of sodium carbonate in water. The mixture is distilled to remove benzene and filtered to remove zinc residues. The dyestuff is salted out from the filtrate with common salt.

Example 7

3.2 parts of dimethoxydibenzanthrone, 0.2 part of sodium β-naphthalenesulphonate, 2.0 parts of zinc dust, 20 parts of dimethylformamide and 1 part of diethanolamine are stirred for 1 hour at 80° C. in a nitrogen atmosphere. The deep blue solution is cooled to 0° C. and sulphated with 6 parts of dimethylformamide sulphur trioxide (containing 40% sulphur trioxide). The sodium salt of the leuco salt is isolated by pouring the reaction mixture into sodium carbonate solution, distilling off the dimethylformamide, filtering off the zinc residues and adding salt to the filtrate.

*Example 8*

3.3 parts of the dyestuff of Example 1 of British specification No. 344,147, 0.3 part of sodium β-naphthalene sulphonate, 15 parts of dimethylformamide, 2.2 parts of methylamine and 3 parts of zinc dust are stirred for 1½ hours at 20° C. in an inert atmosphere. The leuco salt so formed is sulphated at 0° C. by adding 12 parts of dimethylformamide sulphur trioxide containing 40% of sulphur trioxide. The leuco sulphuric salt is isolated by pouring the reaction mixture into sodium carbonate solution and salting out.

We claim:

1. A process for the manufacture of a zinc derivative of the leuco derivative of a vattable compound which comprises reducing the vattable compound with zinc in the presence of a compound from the class consisting of ammonia, primary amines, and secondary amines capable of forming coordination compounds with copper hydroxide in aqueous medium.

2. A process for the manufacture of the leuco sulfuric ester derivative of a vattable compound which comprises reducing the vattable compound with zinc in the presence of a compound from the class consisting of ammonia, primary amines, and secondary amines capable of forming coordination compounds with copper hydroxide in aqueous medium, and subsequently sulfating the zinc derivative of the leuco derivative of the vattable compound.

3. A process according to claim 2, wherein the sulfation is carried out in the presence of a non-vattable organic amide in which the hydrogen atoms attached to the amide nitrogen atoms are replaced by hydrocarbon radicals.

4. A process according to claim 3, wherein said organic amide is dimethyl formamide.

5. A process according to claim 2, wherein the sulfation is carried out in the presence of diethyl formamide.

6. A process according to claim 2, wherein the sulfation is carried out in the presence of tetramethyl urea.

ALAN CHARLTON ROBSON.
FRANK HAYHURST SLINGER.

REFERENCES CITED

The following references are of record in the file of this patent:

UNITED STATES PATENTS

| Number | Name | Date |
|---|---|---|
| 2,028,117 | Wuertz | Jan. 14, 1936 |
| 2,403,226 | Lechner | July 2, 1946 |
| 2,473,802 | Kuh | June 21, 1949 |

FOREIGN PATENTS

| Number | Country | Date |
|---|---|---|
| 19,848 | Great Britain | A. D. 1914 |
| 237,295 | Great Britain | July 8, 1926 |
| 447,892 | Great Britain | May 27, 1936 |